(12) United States Patent
Badrinath Krishna et al.

(10) Patent No.: US 10,302,066 B2
(45) Date of Patent: *May 28, 2019

(54) REDUCING CURTAILMENT OF WIND POWER GENERATION

(71) Applicant: INTERNATIONAL BUSINESS MACHINES CORPORATION, Armonk, NY (US)

(72) Inventors: Varun Badrinath Krishna, Urbana, IL (US); Younghun Kim, White Plains, NY (US); Tarun Kumar, Mohegan Lake, NY (US); Wander S. Wadman, New York, NY (US); Kevin W. Warren, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,434

(22) Filed: Apr. 27, 2018

(65) Prior Publication Data
US 2018/0223807 A1 Aug. 9, 2018

Related U.S. Application Data

(63) Continuation of application No. 15/840,249, filed on Dec. 13, 2017, now Pat. No. 10,041,475, which is a
(Continued)

(51) Int. Cl.
*F03D 7/00* (2006.01)
*F03D 7/02* (2006.01)
(Continued)

(52) U.S. Cl.
CPC ......... *F03D 7/0284* (2013.01); *F03D 7/046* (2013.01); *F03D 7/047* (2013.01); *F03D 7/048* (2013.01);
(Continued)

(58) Field of Classification Search
CPC .......... F03D 7/0284; F03D 9/25; F03D 17/00; F03D 7/046; F03D 7/047; F03D 7/048;
(Continued)

(56) References Cited

U.S. PATENT DOCUMENTS

| | | |
|---|---|---|
| 4,357,542 A | 11/1982 | Kirschbaum |
| 6,975,925 B1 | 12/2005 | Barnes et al. |

(Continued)

FOREIGN PATENT DOCUMENTS

| | | |
|---|---|---|
| CN | 103984987 A | 8/2014 |
| CN | 104077632 A | 10/2014 |

OTHER PUBLICATIONS

Anonymously, "System and Method for Wind Speed Correction of Anemometer on Wind Turbine", ip.com No. IPCOM000238314D, Aug. 18, 2014, pp. 1-6.
(Continued)

*Primary Examiner* — Miranda M Huang
*Assistant Examiner* — Brian T McMenemy
(74) *Attorney, Agent, or Firm* — L. Jeffrey Kelly (57) ABSTRACT

Historical power output measurements of a wind turbine for a time period immediately preceding a specified time are received. Historical wind speed micro-forecasts for the wind turbine for a time periods immediately preceding the specified past time and immediately following the specified past time are received. The historical wind speed micro-forecasts are converted to wind power values. Based on the historical power output measurements and the wind power output values, a machine learning model for predicting wind power output is trained. Real-time power output measurements of the wind turbine and real-time wind speed micro-forecasts for the wind turbine are received. The real-time wind speed micro-forecasts are converted to real-time wind power values. Using the machine learning model with the real-time (Continued)

power output measurements and the real-time wind power values, a wind power output forecast for the wind turbine at a future time is outputted.

1 Claim, 9 Drawing Sheets

Related U.S. Application Data continuation of application No. 15/426,544, filed on Feb. 7, 2017.

(51) Int. Cl.
| | | |
|---|---|---|
| G05B 13/02 | (2006.01) | |
| G05B 19/416 | (2006.01) | |
| F03D 17/00 | (2016.01) | |
| F03D 9/25 | (2016.01) | |
| F03D 7/04 | (2006.01) | |

(52) U.S. Cl.
CPC .............. *F03D 9/25* (2016.05); *F03D 17/00* (2016.05); *G05B 13/026* (2013.01); *G05B 19/416* (2013.01); F05B 2260/821 (2013.01); F05B 2270/1033 (2013.01); F05B 2270/32 (2013.01); F05B 2270/337 (2013.01); F05B 2270/404 (2013.01); F05B 2270/709 (2013.01); G05B 2219/2619 (2013.01); Y02A 30/12 (2018.01); Y02E 10/723 (2013.01); Y02E 10/725 (2013.01)

(58) Field of Classification Search
CPC .............. G05B 13/026; G05B 19/416; F05B 2260/821
See application file for complete search history.

(56) References Cited

U.S. PATENT DOCUMENTS

| | | |
|---|---|---|
| 8,413,500 B2 | 4/2013 | Ely, III |
| 8,606,418 B1 | 12/2013 | Myers et al. |
| 9,371,819 B2 | 6/2016 | Grabau |
| 2002/0084655 A1 | 7/2002 | Lof et al. |
| 2011/0004356 A1 | 1/2011 | Garcia |
| 2011/0040550 A1 | 2/2011 | Graber et al. |
| 2011/0089693 A1 | 4/2011 | Nasiri |
| 2012/0053837 A1 | 3/2012 | Viassolo |
| 2012/0101644 A1 | 4/2012 | Evans et al. |
| 2012/0185414 A1* | 7/2012 | Pyle .................. G01W 1/10 706/11 |
| 2012/0230821 A1 | 9/2012 | Hou et al. |
| 2013/0035798 A1 | 2/2013 | Zhou et al. |
| 2013/0134711 A1 | 5/2013 | Spruce |
| 2014/0003939 A1 | 1/2014 | Adams |
| 2014/0006331 A1 | 1/2014 | Bai et al. |
| 2014/0195159 A1 | 7/2014 | Mewes et al. |
| 2014/0244188 A1 | 8/2014 | Bai et al. |
| 2014/0365187 A1 | 12/2014 | Guzman et al. |
| 2015/0035281 A1 | 2/2015 | Lopez Rubio |
| 2015/0308416 A1 | 10/2015 | Ambekar et al. |
| 2016/0008423 A1 | 3/2016 | Evans et al. |
| 2016/0072289 A1* | 3/2016 | Lazaris ............. G06Q 30/0605 700/287 |
| 2016/0146190 A1 | 5/2016 | Ravindra et al. |
| 2017/0016430 A1* | 1/2017 | Swaminathan ......... F03D 17/00 |

OTHER PUBLICATIONS

Haupt et al., "A Wind Power Forecasting System to Optimize Power Integration", ES1002: Workshop Mar. 22-23, 2011, 7 pages.
Marvuglia et al., "Monitoring of Wind Farms' Power Curves Using Machine Learning Techniques", ResearchGate, Applied Energy, Oct. 2012, 29 pages.
Pending U.S. Appl. No. 15/426,544, filed Feb. 7, 2017, entitled: "Reducing Curtailment of Wind Power Generation", 45 pages.
Pending U.S. Appl. No. 15/840,249, filed Dec. 13, 2017, entitled: "Reducing Curtailment of Wind Power Generation", 40 pages.
Pending U.S. Appl. No. 15/426,524, filed Feb. 7, 2017, entitled: "Reducing Curtailment of Wind Power Generation", 45 pages.
Pending U.S. Appl. No. 15/840,202, filed Dec. 13, 2017, entitled: "Reducing Curtailment of Wind Power Generation", 40 pages.
IBM, List of IBM Patents or Patent Applications Treated as Related, Appendix P, dated Apr. 27, 2018, 2 pages.
Pending U.S. Appl. No. 15/964,434, filed Apr. 27, 2018, entitled: "Reducing Curtailment of Wind Power Generation".

* cited by examiner

REDUCING CURTAILMENT OF WIND POWER GENERATION

BACKGROUND

The present invention relates generally to the field of wind power generation, and more particularly to predicting wind power generation on a computer.

Wind power is the use of air flow through wind turbines to mechanically power generators for electricity. Wind power is a renewable energy resource, but it is intermittent and uncontrollable. Although the power produced by wind tends to be consistent from year to year, it exhibits significant variation over shorter time scales. Wind is therefore often used in conjunction with other electric power sources to give a reliable supply. Due to the erratic nature of wind power, electric utilities may find it difficult to adequately integrate wind power into the electric grid, resulting in involuntary curtailment.

Wind power curtailment is a reduction in the output of a wind turbine or wind farm into the electric grid from what it could otherwise produce, given available wind, and is usually involuntary. Curtailment is typically induced by grid operators or utilities because of transmission congestion or lack of transmission access, or due to oversupply of power during low load periods, for example at night when substantial wind power may be generated but demand is low. As involuntary curtailment may lead to a loss of revenue, curtailment management is an important tool in maintaining system energy balance.

Wind farms handle curtailment in various ways. One way is to simply take some wind turbines offline or orient them away from the wind direction. Another is to use some of the produced energy to create reverse torque that reduces the speed of a turbine blade. Wind farms may also redirect some of the excess generated electricity to storage batteries. Typically, a wind farm may receive a signal from a grid operator or utility to curtail power to a specific level and may cause the wind turbines to reduce their output accordingly.

In a smart grid, grid operators strive to ensure that power plants produce the right amount of electricity at the right time, in order to consistently and reliably meet demand. Because the grid has limited storage capacity, maintaining a balance between electricity supply and demand prevents blackouts and other cascading problems. Grid operators typically send a signal to power plants every few seconds to control the balance between the total amount of power injected into the grid and the total power withdrawn. Sudden power generation shortfalls or excesses due to intermittency may require a grid operator to maintain more reserve power in order to quickly act to keep the grid balanced.

As mentioned, one approach to dealing with wind power intermittency is the use of storage technology, such as large-scale batteries, to store excess power or augment supply in case of a shortfall. However, batteries are expensive and susceptible to wear when subjected to excessive cycling. More accurate and flexible power output models may be advantageous in reducing such cycling.

A method of accurately predicting the output of wind power plants for various future time periods would be a valuable tool, allowing wind farm owners to operate more economically, for example by reducing involuntary curtailment due to oversupply, and allowing grid operators and utilities to reduce the costs of integrating sources of wind power generation into the existing grid, for example, by scaling down conventional resources when sufficient wind generation is predicted.

SUMMARY

Historical electrical power output measurements of a wind turbine for a time period immediately preceding a specified past time are received, wherein the historical electrical power output measurements of the wind turbine for a time period immediately preceding a specified past time comprise a predefined number of measurements at equal time intervals, ending at the specified past time. Historical wind speed micro-forecasts for the geographic location of the wind turbine, for a time period immediately preceding the specified past time and for a time period immediately following the specified past time are received, wherein the historical wind speed micro-forecasts for the geographic location of the wind turbine for a time period immediately preceding the specified past time and for a time period immediately following the specified past time comprise a predefined number of wind speed micro-forecasts at equal time intervals, ending at the specified past time, and a predefined number of wind speed micro-forecasts at equal time intervals beginning with the specified past time, respectively. The historical wind speed micro-forecasts are converted to wind power output values. Based on the historical electrical power output measurements and the wind power output values, a trained machine learning model is generated for predicting wind power output of the wind turbine. Real-time electrical power output measurements of the wind turbine and real-time wind speed micro-forecasts for the geographic location of the wind turbine are received, wherein the real-time electrical power output measurements of the wind turbine comprise a predefined number of measurements at equal time intervals, ending at the current time, and wherein the real-time wind speed micro-forecasts for the geographic location of the wind turbine comprise a predefined number of wind speed micro-forecasts at equal time intervals, ending at the current time, and a predefined number of wind speed micro-forecasts at equal time intervals, beginning with the current time. The real-time wind speed micro-forecasts are converted to real-time wind power output values, wherein the historical wind speed micro-forecasts are converted to wind power output values by one of: a manufacturer's power curve for the wind turbine, or a machine learning model trained to convert wind speed to wind power, based on historical wind speed measurements at the wind turbine and historical electrical power output measurements of the wind turbine. Using the trained machine learning model with the real-time electrical power output measurements and the real-time wind power output values, a wind power output forecast for the wind turbine at a future time is outputted, wherein the machine learning model is one of: a regression neural network, a support vector regression (SVR) model, or a linear regression mode.

In response to determining that an oversupply of wind power would be generated, based in part on the predicted wind power output of the wind turbine, the wind power output of the wind turbine is curtailed.

DETAILED DESCRIPTION

Figure 7:
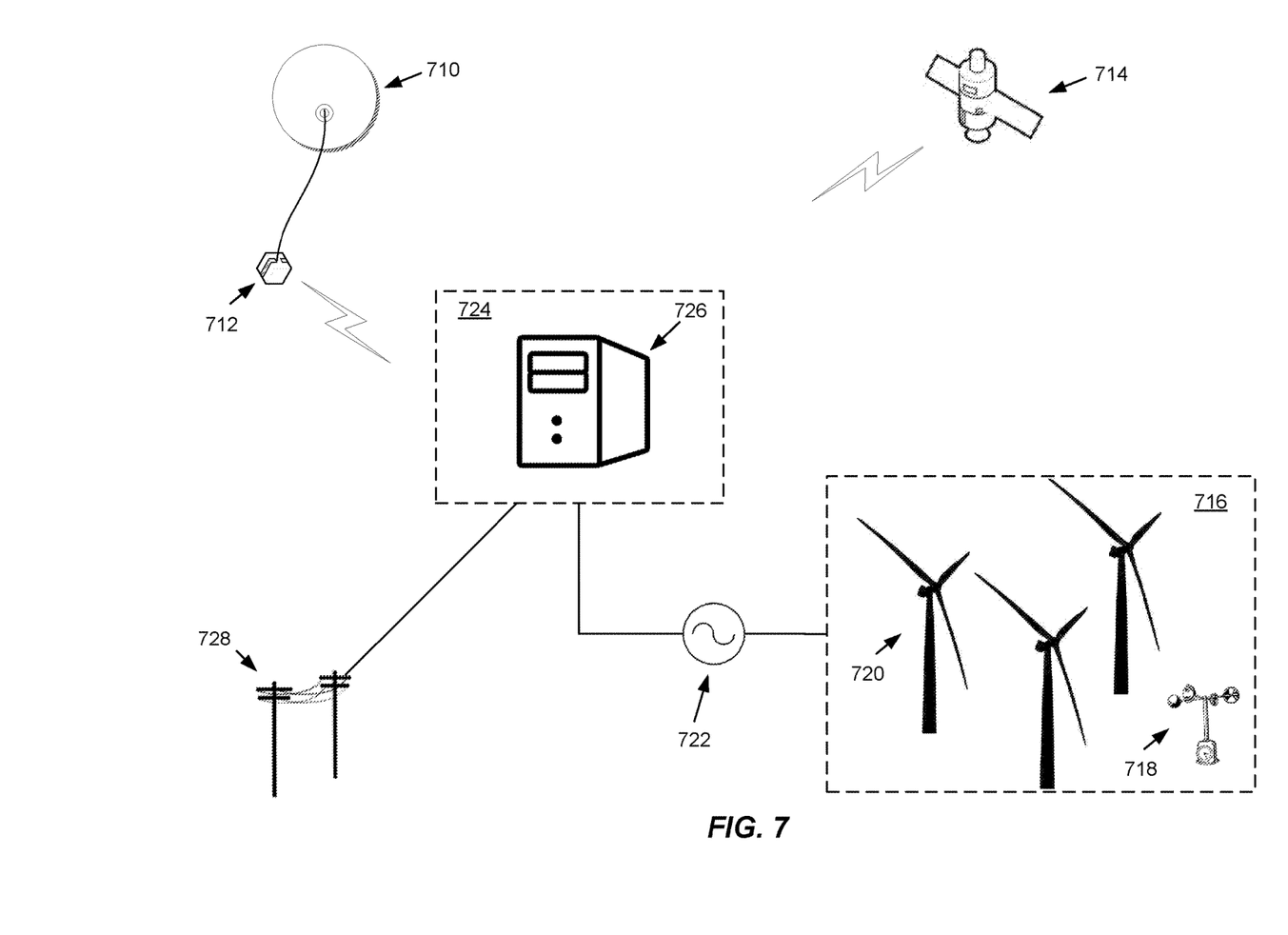
FIG. 7 is a schematic diagram illustrating a system for predicting and controlling power generation of a wind farm, in accordance with an embodiment of the invention.

The term wind farm as used herein refers to an installation or area of land on which wind turbines are installed in order to generate electricity, which is usually sold to energy companies. Wind farms typically consist of many individual wind turbines, in some cases hundreds, connected to an electric power transmission network 728 (FIG. 7).

Machine learning is a field of computer science and statistics that involves the construction of algorithms that learn from and make predictions about data. Rather than following explicitly programmed instructions, machine learning methods operate by building a model using example inputs with known outputs, and using the model to make predictions or decisions about other inputs.

In supervised machine learning a function is inferred from training data. Rather than being explicitly given, the function is represented as a model having various parameters, which generates specified outputs when given appropriate inputs. Training data consists of a set of training examples, each of which includes an input and a known output. During training, or learning, parameters of the model are adjusted, usually iteratively, so that inputs match the outputs in the training examples to some degree of accuracy, based on a predefined metric. The model can then be used to predict the outputs for unseen examples. Typically, the accuracy of the model is evaluated after training by measuring its performance on a test dataset that is separate from the training set.

Supervised machine learning algorithms are usually split into two categories: classification and regression. With classification algorithms, the output is a category. In regression, the output is a numerical value and the goal is to predict a continuous measurement for an observation. Examples of regression algorithms for supervised machine learning include linear regression, regression neural networks, and support vector regression (SVR).

Neural networks are machine learning models inspired by, and partially modeled on, biological neural networks. They are capable of modeling and processing complex, nonlinear relationships between multiple inputs and outputs. These networks are represented as systems of interconnected "neurons," computational units that send messages to each other. The neurons are connected via paths called "synapses." The collection of neurons and synapses is typically organized into three main parts: an input layer, one or more hidden layers, and an output layer. The number of neurons in the input layer corresponds to the number of inputs to the neural network; the number of neurons in the output layer corresponds to the number of outputs generated by the neural network. The number of neurons in the hidden layers may vary, but typically all hidden layers will have the same number of neurons. In a feedforward neural network, the messages, which are computed values, move forward from the input neurons through the neurons in the hidden layers, to the output neurons.

As used herein, the term machine learning model refers to a supervised machine learning model that implements a regression algorithm. The term neural network refers to a regression neural network.

Synapses take an input and multiply it by a numerical weighting factor, indicating the strength of the input in determining the output. Neurons generally sum the weighted values of all incoming synapses and apply an "activation" function to generate an output. Nonlinear activation functions allow neural networks to model complex, nonlinear patterns that neural networks with linear activation functions might not be able to discern. Typical activation functions include linear, sigmoid, and hyperbolic tangent (tan h).

Training a neural network involves calibrating the weights iteratively by repeating two key steps, forward propagation and back propagation, which together constitute an optimization procedure. In forward propagation, a set of weights is used to calculate an output from input data. For the first forward propagation, the initial set of weights may be selected randomly. In back propagation, the error of the output is measured and the weights are adjusted to decrease the error. A cost (or loss) function is used to estimate the size of the error. Typical cost functions are the mean absolute error (MAE) and the mean squared error (MSE), i.e., the mean of the L1-norm or L2-norm of the differences of all computed output values and corresponding known values. Back propagation may be effected by a known optimization method, for example gradient descent or BFGS (the Broyden-Fletcher-Goldfarb-Shanno algorithm).

Forward and back propagation may be repeated until the weights are calibrated to accurately predict the outputs in a set of training examples. To avoid overfitting, the model is usually trained using a subset of the training examples and then tested on a test set that includes the remaining training examples. Overfitting may occur when the model has too many parameters relative to the number of inputs, which may reduce accuracy on examples that are not in the training set.

A hyperlocal weather forecast, also known as a weather micro-forecast, is a highly localized, detailed, short-term prediction of the weather at a given location, for example in a region including a wind farm. For example, a hyperlocal weather forecast may predict the weather in a square kilometer in 10-minute intervals or less, 72 hours or more, ahead of time. Examples of hyperlocal weather forecasting systems are the National Weather Service's High-Resolution Rapid Refresh model and IBM® Deep Thunder™, which has a resolution of 0.2- to 1.2-mile radius. Both are based on the Weather Research and Forecasting (WRF) model, a freely available numerical weather prediction system that was developed by U.S. government agencies and universities.

Historical data including measurements of wind speed at various locations is available, for example, as part of WRF, and from various online databases. For example, the National Renewable Energy Laboratory (NREL) maintains the Wind Integration National Database (WIND). The WIND data is generated on a 2-km by 2-km grid with a 20-m resolution from 10 m to 160 m above ground, and includes meteorological and power data in intervals of 5 minutes.

A weather micro-forecast is generally computed using meteorological observational data that is used as input to a numerical weather prediction model. The meteorological data may include sensor data from surface stations, commercial aircraft, satellites, and weather balloons.

Embodiments of the present invention disclose a computer-implemented method, computer program product, and system for predicting and controlling electrical power output of a wind farm. Based on historical wind speed or electrical power measurements of a wind turbine, and historical wind speed micro-forecasts, a machine learning model is generated that predicts wind power output, given real-time wind speed or wind power measurements of the turbine, and wind speed micro-forecast data. Based on the wind power predictions, output of the wind farm may be regulated so as to reduce curtailment.

Figure 1:
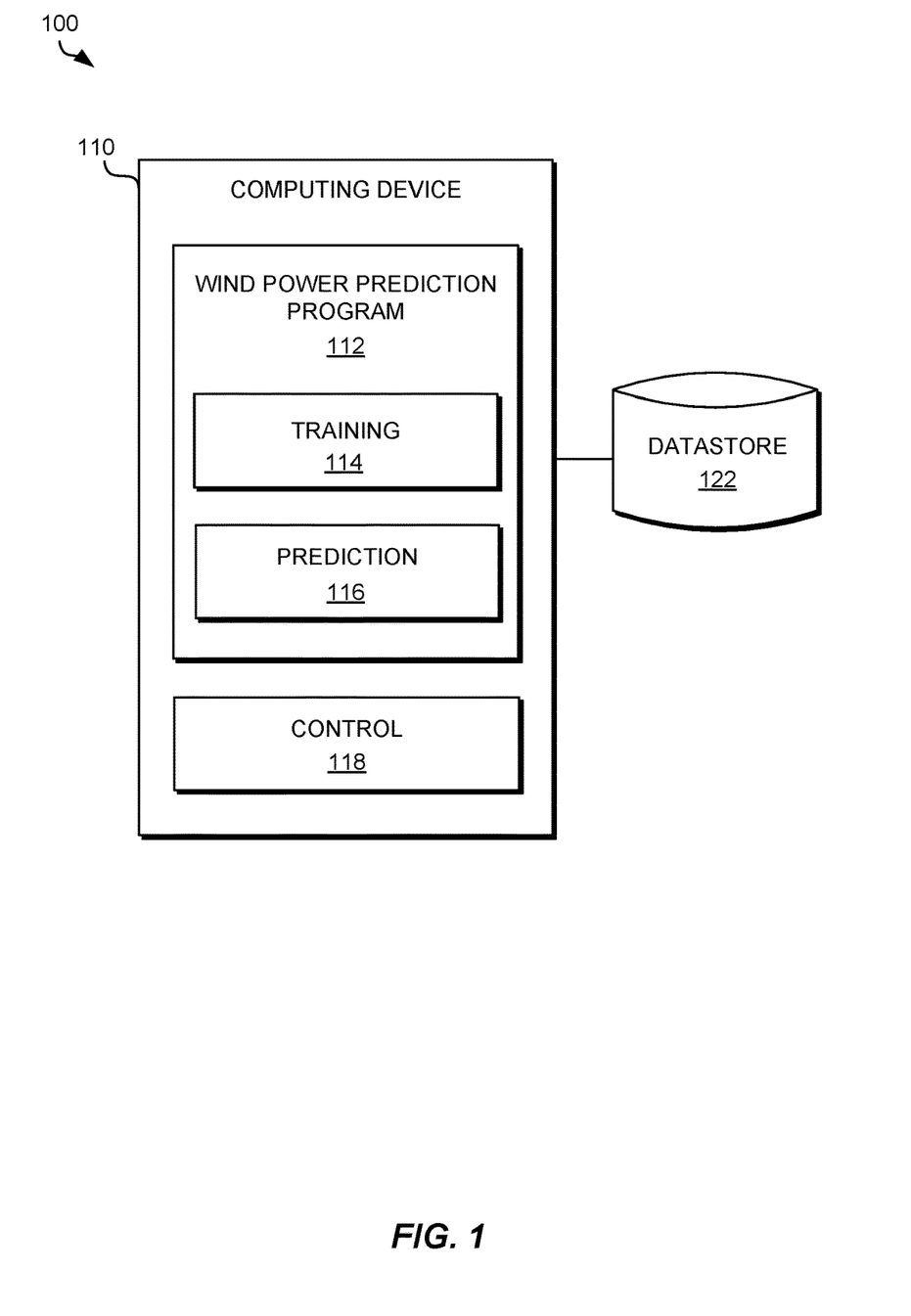
FIG. 1 depicts a functional block diagram of a wind power prediction and control system, in accordance with an embodiment of the present invention.

FIG. 1 is a functional block diagram of a wind power prediction and control system 100, in accordance with an embodiment of the present invention. Wind power prediction and control system 100 includes computing device 110. Computing device 110 represents a computing environment or platform that hosts wind power prediction program 112 and control program 118. In various embodiments, computing device 110 may be a laptop computer, netbook computer, personal computer (PC), a desktop computer, or any programmable electronic device capable of hosting wind power prediction program 112 and control program 118, in accordance with embodiments of the invention. In various embodiments, wind power prediction program 112 and control program 118 may be hosted on different computing devices 110.

In an embodiment of the invention, computing device 110 may host a supervisory control and data acquisition (SCADA) system or other industrial control system, for example control program 118. A SCADA system is a category of software applications used for transferring data and controlling equipment remotely, which may be used to send signals in real time that monitor and control a wind farm.

Computing device 110 may include internal and external hardware components, as described in further detail below with reference to FIG. 9.

In an exemplary embodiment of the invention, computing device 110 includes wind power prediction program 112, control program 118, and datastore 122.

Datastore 122 represents a store of data that may be used to train and test a prediction model, in accordance with an embodiment of the present invention. For example, datastore 122 may include historical data related to weather micro-forecasts and observed power generation for a wind farm. Datastore 122 may also store parameters of one or more machine learning models generated by wind power prediction program 112. Datastore 122 may also serve as a repository for micro-forecast data for the wind farm that may be used to predict future wind power output. Datastore 122 may reside, for example, on a computer readable storage media 908 (FIG. 9) and may be distributed over a network.

Wind power prediction program 112 operates generally to construct, train, and apply a machine learning model that predicts wind power output from a wind farm, for example, wind farm 716 (FIG. 7). Wind power prediction program 112 is trained using historical measurements of wind speed or wind power, and historical wind speed micro-forecasts, and, given real-time measurements of wind speed or power, and wind speed micro-forecast data, predicts wind power output at future times. Wind power prediction program 112 may include training module 114 and prediction module 116.

Training module 114 operates to receive historical measurements and historical wind speed micro-forecasts, corresponding to a wind turbine, from datastore 122 and build a prediction model. In one embodiment, the historical measurements are electrical power output measurements of a wind turbine; in another embodiment, the historical measurements are wind speed measurements at a wind turbine. Training module 114 may combine the historical measurements and wind speed micro-forecasts into a training matrix, described in more detail below, each of whose rows includes one training example. Training module 114 may use the training matrix to construct and calibrate the prediction model. In an embodiment of the invention, the prediction model is a wind power prediction model; in another embodiment, the model is a wind speed prediction model. For example, the prediction models may be feedforward neural networks. In this case, training module 114 constructs the prediction model by fixing, for the neural network, the number of input neurons, the number of output neurons, the number of hidden layers, and the number of neurons in the hidden layers, and selecting an initial set of weights. Training module 114 then calibrates the model using the training matrix via forward and back propagation.

Prediction module 116 operates generally to predict future wind power output of a wind turbine 720 (FIG. 7) using the prediction model created by training module 114, given real-time wind power or wind speed data and wind speed micro-forecast data for the geographic location of the wind turbine, according to various embodiments of the invention. Prediction module 116 receives either wind power or wind speed measurements, corresponding to the inputs that were used by training module 114 to train the model, and applies the trained wind power prediction module to compute predicted wind power output for a time period in the future, for example, at intervals up to six hours in the future.

Control program 118 operates generally to control wind power production of the wind farm 716 (FIG. 7), based on the output of prediction module 116. For example, control program 118 may cause the wind farm to curtail power production in response to a prediction of oversupply. For example, control program 118 may cause one or more wind turbines 720 to be taken offline or to be oriented away from the wind direction. Alternatively, control program 118 may cause some of the energy produced by a wind turbine to be used to create reverse torque that reduces the speed of the turbine blade. Control program 118 may also cause wind farm 716 to redirect some of the excess generated electricity to one or more storage batteries.

Figure 2:
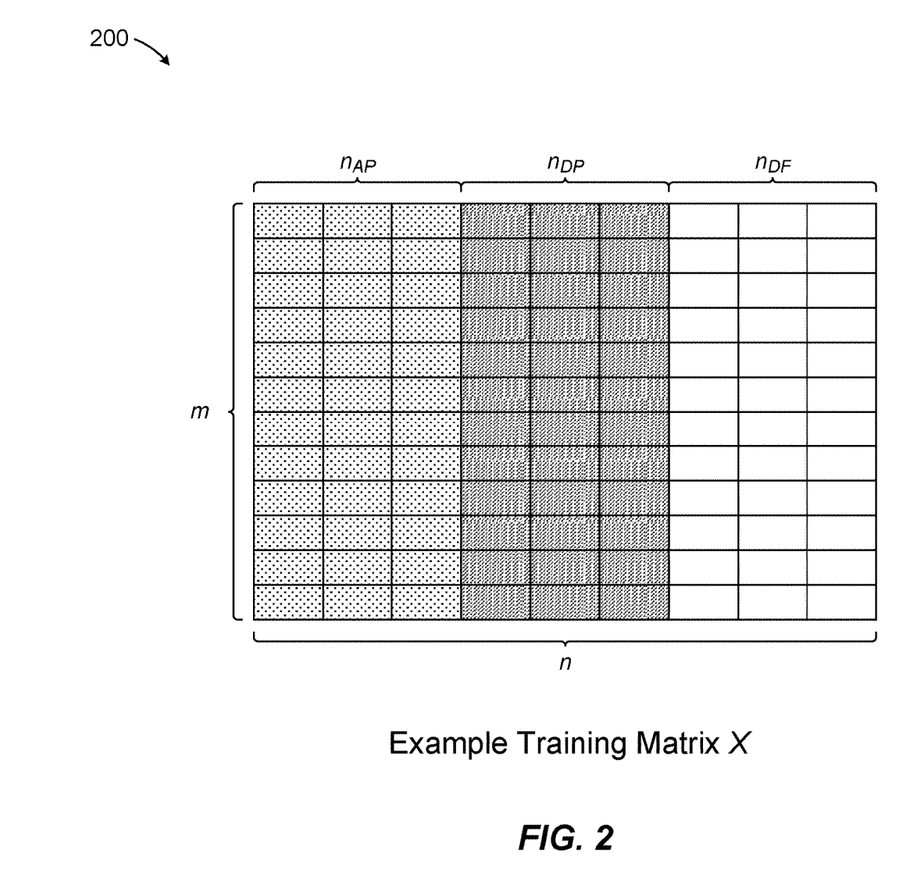
FIG. 2 illustrates a training matrix for training a machine learning model to predict wind power, in accordance with an embodiment of the present invention.

FIG. 2 shows an example training matrix X 200, in accordance with an exemplary embodiment of the invention. Training matrix X 200 may be used, for example, to train a wind power prediction model. Training matrix X 200 has $n_{AP}$ columns corresponding to the number of recent past wind power measurements input to the prediction model; $n_{DP}$ columns corresponding to the number of recent past wind speed micro-forecast values input to the model; and $n_{DF}$ columns corresponding to the number of immediate future wind speed micro-forecast values input to the model. The m rows of X include training examples used to train the model. Thus, X is an m×n matrix with m rows and n columns, where $n=n_{AP}+n_{DP}+n_{DF}$ is the total number of features, i.e., input parameters, used in the prediction model.

In another embodiment of the invention, the $n_{AP}$ columns of training matrix X 200 contain recent past wind speed measurements.

As used herein, recent past measurements relative to a given time t refer to measurements at a series of times that immediately precede t (and may end with t). For training data, t may be any past time. For predicted power output, t is usually the current time. Typically, these measurements are taken at equal time intervals, of the form t−k·Δt, t−(k−1)·Δt . . . , t−Δt, t, for some predefined integer k, where Δt is a fixed time interval. Similarly, recent past wind speed forecasts relative to a time t refer to wind speed forecasts for a series of times that immediately precede t (and may end with t). Typically, these forecasts are for an evenly spaced series of times, as described above. Immediate future wind speed forecasts relative to a time t denote wind speed forecasts at a series of times that immediately follow t (and may begin with t). Typically, these forecasts are for an evenly spaced series of times, of the form t+Δt, . . . , t+(k−1)·Δt, t+k·Δt, for some predefined integer k, where Δt is a fixed time interval.

The m training examples for the set of n features may be obtained from the data, for example, by sliding a window of width n centered on a given time through the input dataset.

Since in some cases curtailment may affect the output of a wind turbine 720 (FIG. 7), training examples will typically be based on the possible, or producible, power generated by the wind turbine, rather than the active, or actual, power produced. Modern wind turbines typically make both types of power values available. The resulting predicted wind power is then the power that is possible to produce, independent of curtailment.

The values of the model parameters $n_{AP}$, $n_{DP}$, and $n_{DF}$ may be chosen, for example, by systematically examining the impact of various choices on the accuracy and complexity of the prediction model. Increasing them may increase prediction accuracy as well as algorithm run time. However, accuracy tends not to significantly increase when parameter values are increased beyond a certain point referred to as the point of saturation. A typical value of $n_{AP}$ is 6, corresponding to measurements at 6 past times. If measurements are taken every 10 minutes, for example, then this corresponds to looking back one hour.

In an embodiment of the invention, the prediction model generates wind power predictions at a predefined number h of "horizons," or intervals in the future. For example, the prediction model may generate short-term predictions, e.g., at 10-minute time intervals from 0 to 6 hours in the future. In another embodiment, the prediction model generates wind speed predictions at a predefined number h of horizons in the future.

In an embodiment of the invention, the prediction model is a neural network. In this case, in addition to $n_{AP}$, $n_{DP}$, and $n_{DF}$, the number l of hidden layers and the number q of neurons per hidden layer in the neural network model must be selected. As with the other model parameters, these may be chosen by observing their impact while systematically varying them.

Increasing the parameters $n_{AP}$, $n_{DP}$, $n_{DF}$, l, and q beyond a certain point may lead to overfitting, which may reduce accuracy on examples not in the training set while increasing the complexity of the model. In order to prevent overfitting, the model may be calibrated using one subset of the training examples and then systematically tested on a second, disjoint subset of the training examples.

For example, a typical approach to finding values for the parameters $n_{AP}$, $n_{DP}$, $n_{DF}$, l, and q is as follows. The parameters are divided into two groups, with Group I containing for $n_{AP}$, $n_{DP}$, $n_{DF}$, and Group II containing l, and q. Group I indicates how much data is needed to make a good prediction. Group II indicates how large the neural network should be in order to get the best prediction. For each choice of parameters in Groups I and II, the neural network is trained on a set of training examples, which determines the weights. Starting with small values, the parameters in Group I may be increased stepwise until saturation, i.e., when using more data does not significantly improve the prediction. Initially, l may be 0 or 1 and q may be equal to n. Once saturation is reached while varying the parameters in Group I, the parameters in Group II may be increased in a stepwise fashion, using the Group I parameters that were just determined, until the prediction begins to worsen.

If there are n input features, then the input layer of the neural network will have n neurons. The number of neurons in the output layer corresponds to the number h of "horizons," or intervals in the future, that are to be predicted. For example, if wind power predictions are to be generated at 10 minute intervals for up to 6 hours, i.e., short-term predictions, then there will be 360 output neurons. The number of neurons in different hidden layers may vary, but typically all hidden layer will have the same number q of neurons.

An activation function must also be chosen for the neural network. The activation function selected for the input layer may be different from the one chosen for the hidden layers. For example, a sigmoid or tan h function may be used for the input layer and a linear activation function may be used for the hidden layers. The choice of l and q may depend on the choice of activation functions, as well as on the choice of cost function.

In an embodiment of the invention, wind speed measurements are taken with an anemometer, for example anemometer 718 (FIG. 7), installed on one or more wind turbines 720 of a wind farm 716 every 10 minutes over a lengthy period (e.g., a year or more). The anemometers may be installed at a range of heights up to the hub height of the wind turbines. Alternatively, the anemometers may be installed on one or more measurement towers, or "met masts," on the wind farm. In an embodiment, wind speed measurements are converted to wind power values using the manufacturer's power curve (the actual power measurements may be slightly lower than the theoretical power due to suboptimal wind turbine blade orientation). In another embodiment, a trained neural network is used to convert wind speed measurements to wind power data. Hyperlocal (e.g., within a 0.2-1.2-mile radius) wind velocity forecasts for each wind turbine are obtained from a hyperlocal weather forecasting engine. The forecasts may be made, for example, for one day ahead. Wind speed may be derived from wind velocity at the height of the wind turbine hub. The altitude is important to note, because wind turbines are influenced by wind at the altitude of the turbine, which may have a different velocity from the wind at ground level.

In an embodiment, if gaps occur in the input datasets, for example if one or more historical wind speed or wind power measurements are missing, the missing data may be generated by linear interpolation, or by another interpolation scheme, before using the data.

Each row in the training matrix X 200 supplies n input data values for the n neurons in the input layer of the neural network. The neural network may be viewed as a function $f$ that maps each row of X to a vector of length h containing the values of the h neurons in the output layer. The computed output vector may be expressed as the actual value y plus a prediction error: y+ε. Thus, the goal is to find the weights that minimize $\|f(X)-Y\|$, where Y is a matrix with m rows and h columns, with each row containing the output for the corresponding input row in X, and $\|\cdot\|$ represents the chosen cost function, for example, MAE or MSE.

Figure 3:
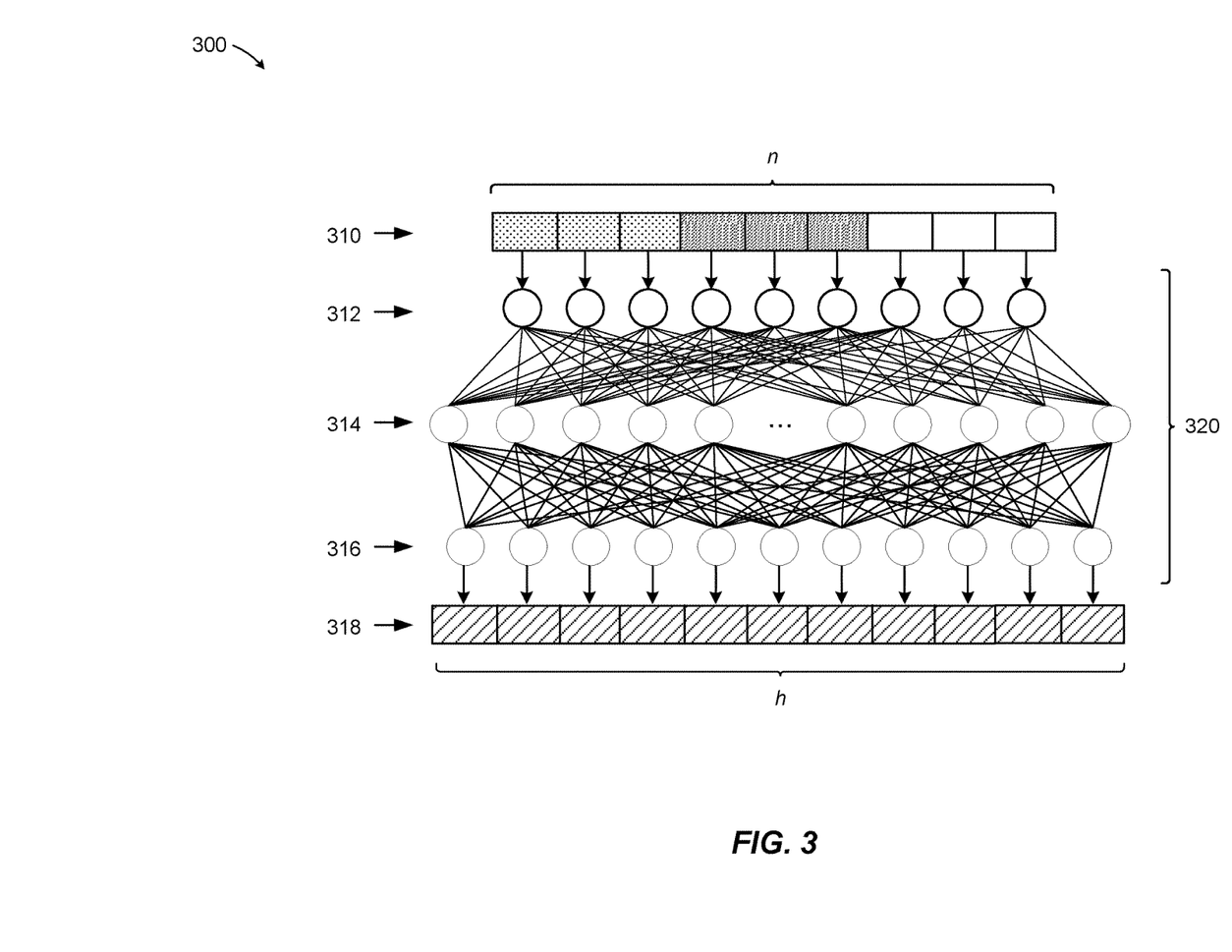
FIG. 3 is a schematic diagram depicting a prediction model based on a neural network.

FIG. 3 is a schematic diagram 300 depicting a prediction model based on a neural network, in accordance with an embodiment of the present invention. Row vector 310 represents the n inputs to the neural network and corresponds to one row of training matrix X 200 (FIG. 2). Each input of the n inputs is entered into a corresponding neuron in the input layer 312 of the neural network 320. The neurons in input layer 312 are connected to neurons in the first hidden layer 314. Typically, each neuron in one layer is connected to each neuron in the next layer. There may be multiple hidden layers; only one is shown in diagram 300. Row vector 318 represents the outputs of the model, which are wind power forecasts. Each neuron of the h neurons in the output layer 316 corresponds to a prediction horizon, i.e., a future time for which the model generates a wind power or wind speed forecast.

Figure 4A:
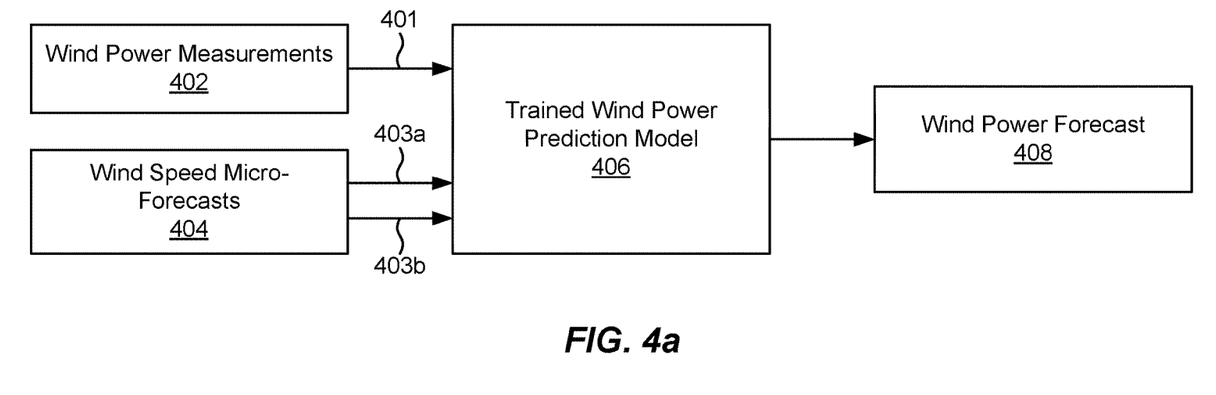
FIGS. 4a and 4b are block diagrams, each depicting workflow in predicting wind power in accordance with an embodiment of the present invention.
Figure 4B:
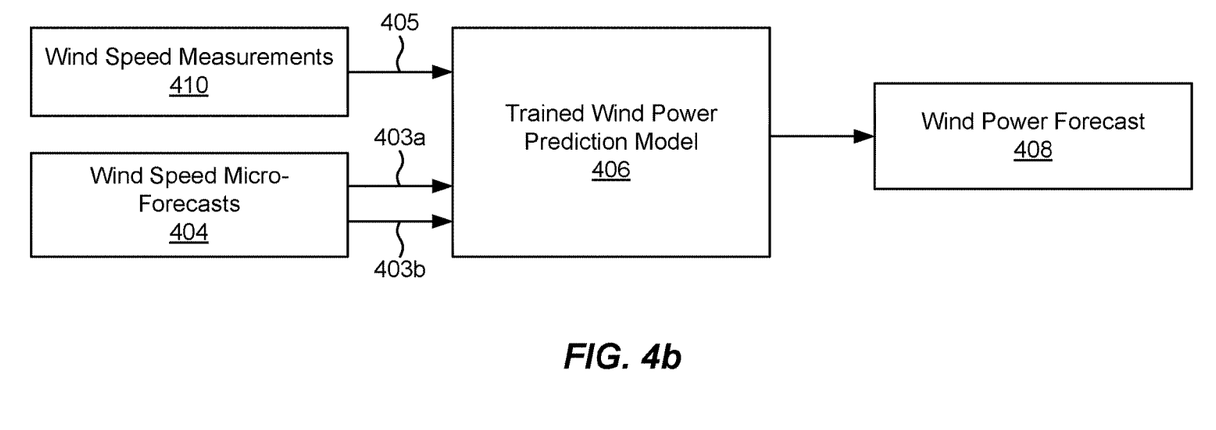

FIGS. 4a-4b and 5a-5b are block diagrams depicting functional components of a system to predict wind power output, in accordance with various embodiments of the present invention. The embodiments correspond to various machine learning models for predicting wind power output. The machine learning models may be, for example, neural networks. The different prediction models may be represented in short-hand form according to the types of input data they receive, with 'A' denoting actual measurements and 'D' denoting micro-forecast values. Subscripts S and P refer to wind speed and wind power, respectively. Thus, for example, FIG. 4a corresponds to a model, denoted by $A_P D_S$, for which the inputs are wind power measurements 402 and wind speed micro-forecasts 404. Using this convention, the model represented in FIG. 4b is $A_S D_S$ and for FIG. 5a the model is $A_P D_P$. For FIG. 5b the model is also of type $A_S D_S$; however, in FIG. 4b the inputs are directly mapped to wind power by the machine learning model, while in FIG. 5b the inputs are first mapped to wind speed and then converted to wind power using a power curve, as described below. Wind power measurements 402 and wind speed measurements 410 may include recent past wind speed measurements, relative to selected times in the past. Wind speed micro-forecasts 404 may include both recent past wind speed forecasts and immediate future wind speed forecasts, relative to selected times in the past.

In FIGS. 4a and 4b, as well as 5a, the machine learning model is a wind power prediction model 406 that outputs a wind power forecast 408. In FIG. 5b the model is a wind speed prediction model 514 that outputs a wind speed forecast 516. Wind speed forecast 516 may be converted to a wind power forecast 408 by a trained power curve model 518, as described below.

As an example, for the model $A_P D_S$ depicted in FIG. 4a, for which the inputs are wind power measurements 402 and wind speed micro-forecasts 404, suppose that the numbers of inputs for the model are $n_{DP}=n_{DF}=4$ and $n_{AP}=3$. Then the wind speed micro-forecasts 404 include four recent past wind speed forecasts 403a and four immediate future wind speed forecasts 403b, relative to a given time t. The wind power measurements 402 include three recent past wind power measurements 401 relative to t. Wind power prediction model 406 may be trained using training examples that include available measurements and forecasts at times in the past. For example, assuming 10-minute time intervals, wind power prediction model 406 may be trained using data for times t in the past for which the following data is available:

a. wind power measurements 502 at times t−30, t−20, t−10, t (recent past wind power measurements 401).
b. wind speed micro-forecasts 504 at times t−40, . . . , t−10, t (recent past wind speed forecasts 403a) and at t+10, . . . , t+40 (immediate future wind speed forecasts 403b); and
c. wind power measurements 402 at a given number of "look-ahead" times, e.g., at t+T, where T=10, 20, . . . , 360 minutes (36 look-ahead times).

Trained wind power prediction model 406 then maps wind power measurements 402 and wind speed forecasts 404 to wind power forecasts 408 at the times t+T.

For example, at noon a wind farm owner or electric grid operator might enter a sequence of actual wind power measurements 402 that end at noon, along with wind speed forecasts 404 at a sequence of times before and after noon into trained wind power prediction model 406, and would receive wind power forecasts 408 for a sequence of times after noon.

FIG. 4b depicts a model $A_S D_S$ that differs from model $A_P D_S$ depicted in FIG. 4a in that, along with wind speed forecasts 404, the input measurements are wind speed measurements 410 rather than wind power measurements 402. As with the model depicted in FIG. 4a, the wind speed micro-forecasts 404 include recent past wind speed forecasts 403a and immediate future wind speed forecasts 403b. The wind speed measurements 410 include recent past wind speed measurements 405.

Figure 5A:
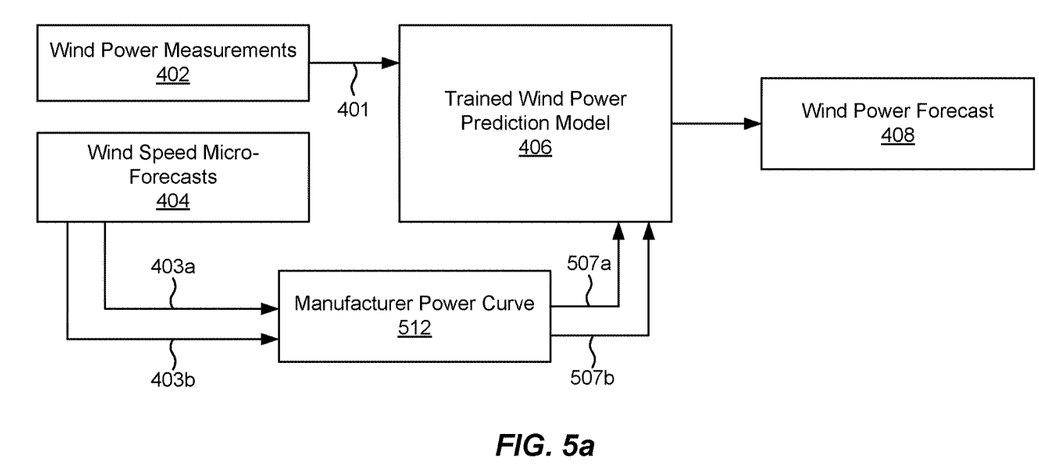
FIGS. 5a and 5b are additional block diagrams, each depicting workflow in predicting wind power in accordance with an embodiment of the present invention.
Figure 5B:
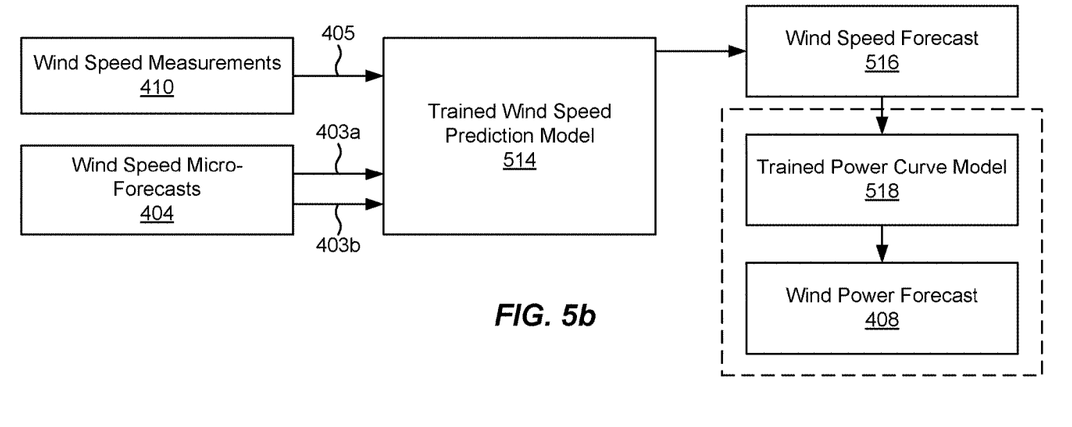

In FIG. 5a, the wind power data input to wind power prediction model 406 is obtained by applying the manufacturer's power curve 512, which converts wind speed to power output for a wind turbine, to the wind speed micro-forecasts 404, which include recent past wind speed forecasts 403a and immediate future wind speed forecasts 403b. If the manufacturer's power curve 512 is not available, a trained power curve model 518 may be used to estimate the power curve, as discussed below. The outputs from manufacturer's power curve 512 or trained power curve model 518 are recent past wind power forecasts 507a and immediate future wind power forecasts 507b, which are then input to wind power prediction model 406.

In FIG. 5b, with model $A_S D_S$, wind speed prediction model 514 outputs a wind speed forecast 516. In an embodiment of the invention, a trained power curve model 518 may then be used to generate a wind power forecast 408 from output wind speed forecast 516, or, alternatively the manufacturer's power curve 512 could be used. As with the model depicted in FIG. 4b, the inputs are wind speed forecasts 404, which include recent past wind speed forecasts 403a and immediate future wind speed forecasts 403b, and wind speed measurements 410, which include recent past wind speed measurements 405.

The models $A_P D_P$ and $A_P D_S$ depicted in FIGS. 5a and 5b, respectively, may be advantageous when, for example, an electric utility does not have anemometer measurements but does have wind power measurements available.

A manufacturer's power curve 512 may not always be available for each wind turbine. In this case, a neural network may be used to estimate the mapping between wind speed and wind power output. The corresponding neural network has one input neuron and one output neuron, since it maps scalars to scalars. A suitable cost function is MAE. The values of the parameters q and l must be chosen, and activation functions for the input and hidden layers must be selected. For example, linear activation functions for the hidden layers and a sigmoid or tan h activation function for the input layer may be appropriate. Typical values for l and q are in the range l>2 and q>3; for example, l=6 and q=22. Finding near optimal values may require a systematic search of the (l,q) parameter space, for example by alternately calibrating the model on a subset of the training examples and then testing the model on a disjoint test subset of the training examples.

In other embodiments of the invention, a different machine learning model, for example support vector regression (SVR), may be used to estimate the mapping between wind speed and wind power output for a wind turbine.

Figure 6:
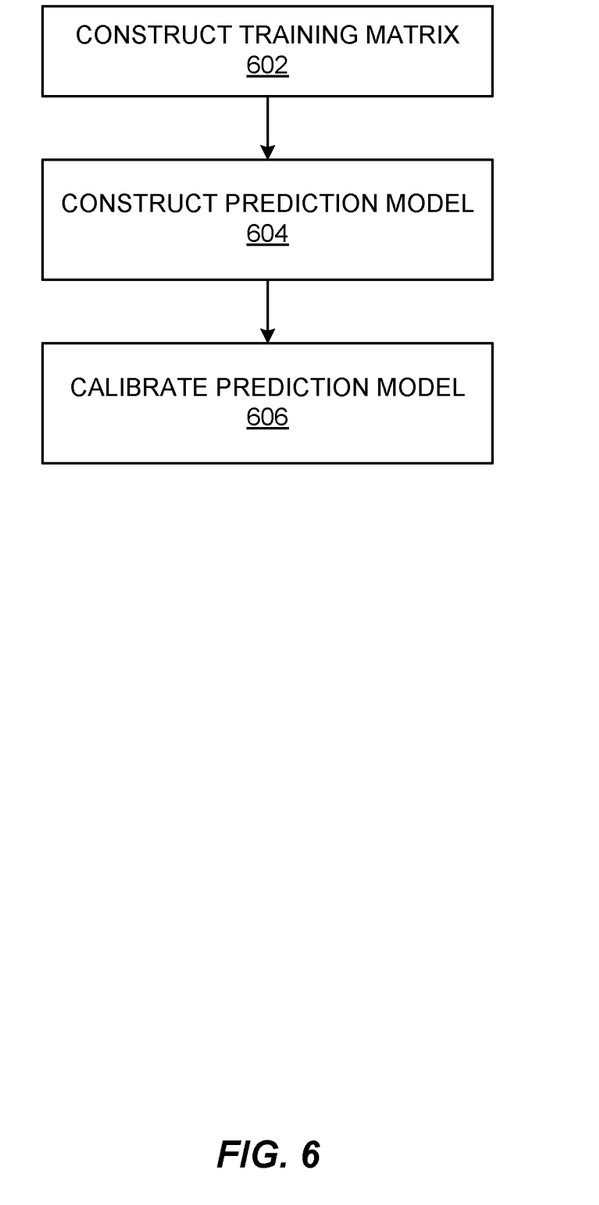
FIG. 6 is a flowchart depicting various operational steps of a wind power prediction program, in accordance with an embodiment of the present invention.

FIG. 6 is a flowchart depicting various operational steps performed by computing device 110 in executing wind power prediction program 112, in accordance with several embodiments of the invention. Specifically, FIG. 6 depicts how training module 114 constructs and calibrates a prediction model. Training module 114 receives historical measurements and wind speed micro-forecasts from datastore 122 and constructs training matrix X (step 602). In one embodiment, the historical measurements are wind power measurements; in another embodiment, the measurements are wind speed measurements. Training module 114 constructs a prediction model (step 604). In an embodiment, the prediction model is a wind power prediction model; in other embodiments, the model is a wind speed prediction model. In various embodiments, the prediction model is a feedforward neural network. In this case, training module 114 constructs the prediction model by selecting values for the parameters $n_{AP}$, $n_{DP}$, $n_{DF}$, l, and q, as well as an initial set of weights. Training module 114 then calibrates the model using training matrix X via forward and back propagation (step 606).

FIG. 7 is a schematic diagram illustrating a system 700 for predicting power generation of a wind farm 716, in accordance with an embodiment of the invention. The system includes sensors for collecting meteorological data in a region of the wind farm, which may include ground sensors such as anemometer 718 and atmospheric sensors such as radiosondes 712 attached, for example, to weather balloons 710, weather satellites 714, or commercial aircraft (not shown). Anemometers 718 may be attached to individual wind turbines 720. The meteorological data may be used along with other data in a numerical weather model such as WRF to generate wind micro-forecasts for the wind farm. System 700 may also include power meters 722 such as net meters for measuring power output of the wind farm, or power meters attached to individual wind turbines 720. The system may also include one or more computer processors 726, for example in a grid management system 724, for generating wind speed micro-forecasts and power output data for the wind farm. The system may also include program instructions to be executed on one or more of the computer processors that implement a method for predicting and controlling wind power output, in accordance with an embodiment of the present invention, for example wind power prediction and control system 100. The system may also include program instructions to be executed on one or more of the computer processors that receive wind power or wind speed measurements, and wind speed micro-forecasts for the wind farm, and predict wind power output of the wind farm for future time intervals.

In an embodiment of the invention, grid management system 724 includes a SCADA server or other industrial control system.

Figure 8:
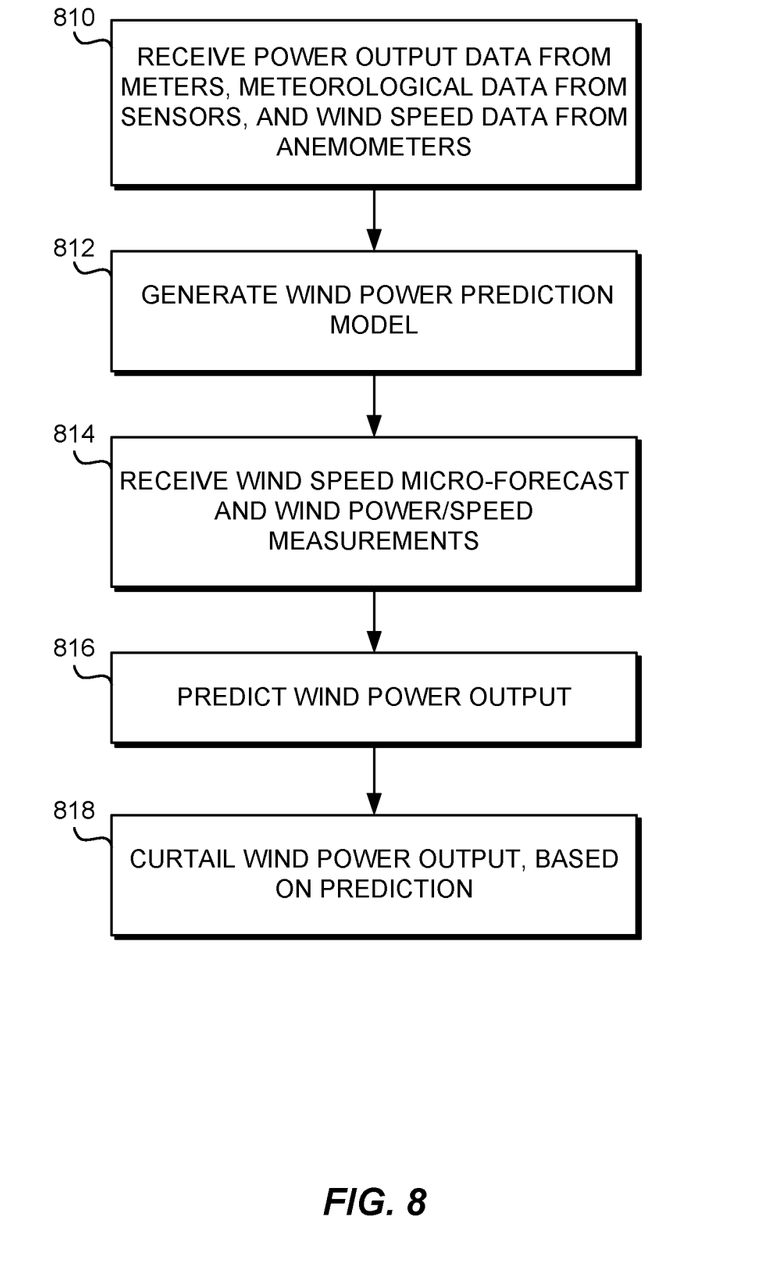
FIG. 8 is a flowchart depicting various operational steps performed in predicting and controlling electrical power generation of a wind farm, in accordance with an embodiment of the invention.

FIG. 8 is a flowchart depicting various operational steps performed by system 700 (FIG. 7) in predicting power generation of a wind farm 716, in accordance with various embodiments of the invention. Power output data from power meters 722 and meteorological data from sensors such as radiosonde 712 and weather satellite 714, as well as wind speed data from anemometer 718, are received (step 810). A wind power output prediction model, as described above, is generated (step 812). A wind speed micro-forecast for the wind farm for future time periods and real-time wind power measurements or real-time wind speed measurements are received (step 814). Power output for future time periods is predicted, based on the wind power prediction model (step 816). Based on the output of the wind power prediction model, grid management system 724 may send a signal in real time to wind farm 716 that causes the wind farm to curtail wind power generation (step 818). For example, grid management system 724 may, in case of a predicted surplus, cause some of the wind power generated by a wind turbine 720 to be stored. Alternatively, in case of a predicted shortfall, grid management system 724 may supplement generated wind power with stored power.

Figure 9:
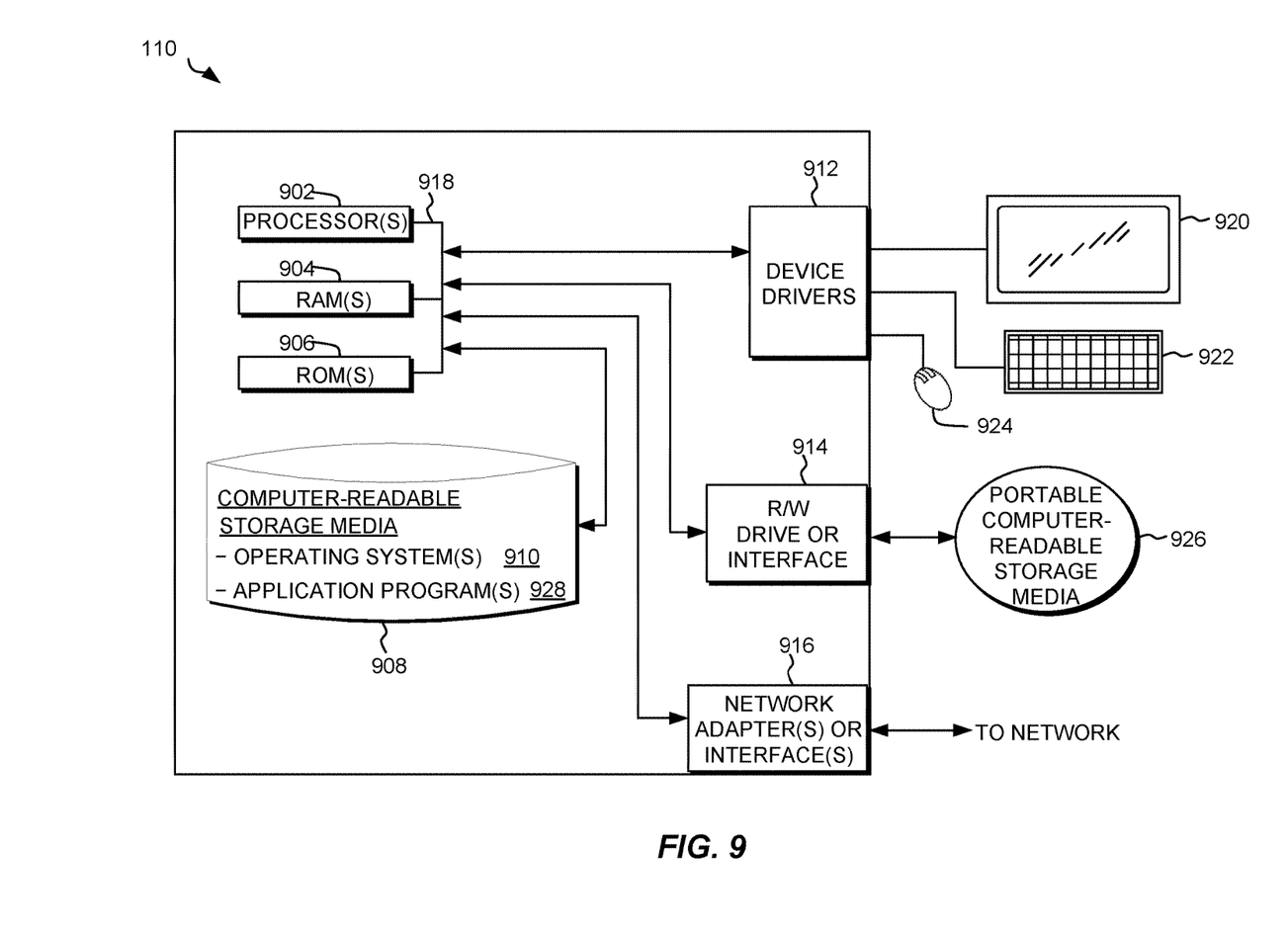
FIG. 9 is a functional block diagram illustrating a data processing environment, in accordance with an embodiment of the present invention.

FIG. 9 depicts a block diagram of components of a computing device 110, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, wind power prediction program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. The network may also employ power line communication.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user s. The device drivers 912, R/W drive or interface 914 and network adapter or interface 916 may comprise hardware and software (stored on computer readable storage media 908 and/or ROM 906).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer program product comprising:
   a computer-readable storage medium, and program instructions stored on the computer-readable storage medium, which when executed by a computer cause the computer to perform a method comprising:
   receiving, by a computer, historical electrical power output measurements of a wind turbine for a time period immediately preceding a specified past time, wherein the historical electrical power output measurements of the wind turbine for a time period immediately preceding a specified past time comprise a predefined number of measurements at equal time intervals, ending at the specified past time;
   receiving, by the computer, historical wind speed micro-forecasts for the geographic location of the wind turbine, for a time period immediately preceding the specified past time and for a time period immediately following the specified past time, wherein the historical wind speed micro-forecasts for the geographic location of the wind turbine for a time period immediately preceding the specified past time and for a time period immediately following the specified past time comprise a predefined number of wind speed micro-forecasts at equal time intervals, ending at the specified past time, and a predefined number of wind speed micro-forecasts at equal time intervals beginning with the specified past time, respectively;
   converting, by the computer, the historical wind speed micro-forecasts to wind power output values;
   generating, by the computer, based on the historical electrical power output measurements and the wind power output values, a trained machine learning model for predicting wind power output of the wind turbine;
   receiving real-time electrical power output measurements of the wind turbine and real-time wind speed micro-forecasts for the geographic location of the wind turbine, wherein the real-time electrical power output measurements of the wind turbine comprise a predefined number of measurements at equal time intervals, ending at the current time, and wherein the real-time wind speed micro-forecasts for the geographic location of the wind turbine comprise a predefined number of wind speed micro-forecasts at equal time intervals, ending at the current time, and a predefined number of wind speed micro-forecasts at equal time intervals, beginning with the current time;
   converting, by the computer, the real-time wind speed micro-forecasts to real-time wind power output values, wherein the historical wind speed micro-forecasts are converted to wind power output values by one of: a manufacturer's power curve for the wind turbine, or a machine learning model trained to convert wind speed to wind power, based on historical wind speed measurements at the wind turbine and historical electrical power output measurements of the wind turbine;
   outputting, by the computer, using the trained machine learning model with the real-time electrical power output measurements and the real-time wind power output values, a wind power output forecast for the wind turbine at a future time, wherein the machine learning model is one of: a regression neural network, a support vector regression (SVR) model, or a linear regression mode;
   determining, by the computer, that an oversupply of wind power would be generated, based in part on the predicted wind power output of the wind turbine; and
   curtailing, by the computer, wind power output of the wind turbine.

* * * * *